Jan. 14, 1947.　　　　P. R. THOMPSON　　　　2,414,247
HAND SHIELD
Filed Aug. 21, 1944
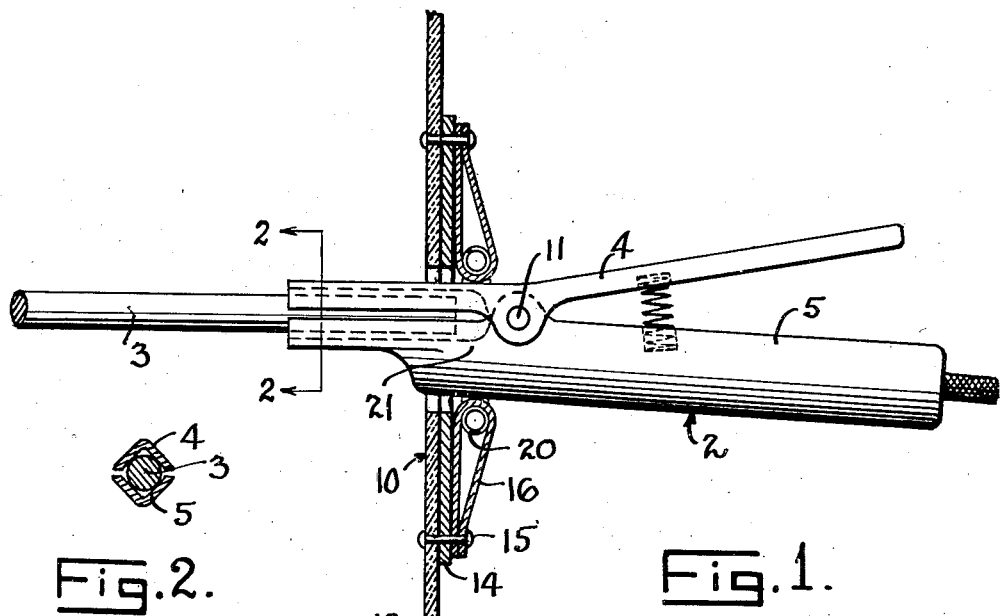
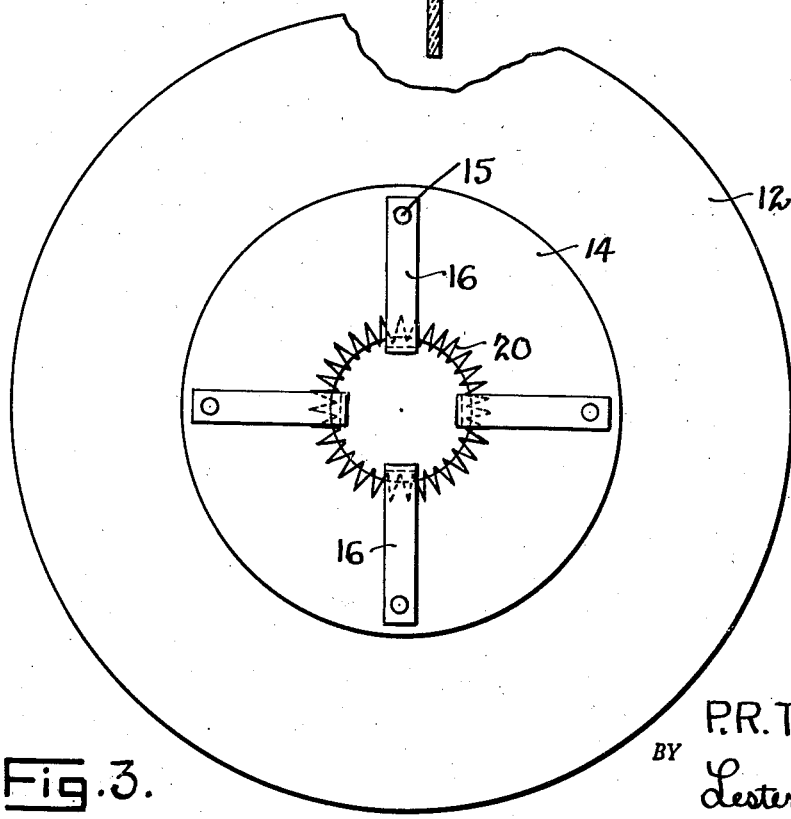
INVENTOR.
P. R. THOMPSON.
BY Lester B. Clark.
ATTORNEY.

Patented Jan. 14, 1947

2,414,247

UNITED STATES PATENT OFFICE 2,414,247

HAND SHIELD

Perry R. Thompson, Houston, Tex.

Application August 21, 1944, Serial No. 550,397

3 Claims. (Cl. 2—17)

The invention relates to a hand shield for electrode holders whereby the sparks and heat due to the welding operation are prevented from contact with the hand of the welder.

In electric welding operations there is considerable arcing and sparking, and the heat often interferes with and reduces the efficiency of the welder. This is particularly true with vertical and overhead welding operations in spite of the fact that the welder may wear heavy gloves. The sparks often burn holes in the gloves.

It is one of the objects of the present invention to provide a shield for electrode holders which can be readily positioned or removed.

Another object of the invention is to provide an electrode holder shield which is arranged to grip the holder in order to retain the shield in position.

Another object of the invention is to provide a hand shield having a coil spring construction to retain the shield upon an electrode holder or the like.

Other and further objects of the invention will be readily apparent when the following description is considered in connection with the accompanying drawing wherein:

Fig. 1 is a side view of an electrode holder with the hand shield shown in section thereon.

Fig. 2 is a section taken on the line 2—2 of Fig. 1 to illustrate the manner of retaining the electrode.

Fig. 3 is a plan view looking down on the back side of the shield.

In Fig. 1 an electrode holder 2 is shown as clamping an electrode 3 by means of the spring pressed clip 4 in position ready for a welding operation. The welder clasps the handle 5 of the holder to perform the welding operation.

A shield 10 is shown as having been passed over the end of the holder to a point adjacent the pivot pin 11.

The shield is made up of a circular sheet 12 of suitable asbestos or other fireproof material which will serve as an insulating member to protect the hand of the welder against sparks and heat. This sheet may be of any suitable size or shape, but Fig. 3 shows a circular sheet of substantially actual size.

This sheet 12 has a reinforcing ring 14 connected thereto by means of the rivets or bolts 15 which also pass through the looped straps 16.

These looped straps may be several in number as seen in Fig. 3 and are passed about a coil spring 20 which is of a size to normally grip the surface 21 of the electrode holder adjacent the pivot pin 11. The straps 16 will be of sufficient length so that the loop permits contraction of the coil spring to grip the holder. The loops also permit expansion of the spring as it is passed into position over the electrode holder.

The shield may be made of any suitable composition and while it has been shown as a flat circular disc it may be spherical in configuration to encourage particles to fall or slide off. In this manner the burning of holes through the shield is avoided.

The hand shield is simple and economical in its construction and may be made of any suitable materials such as sheet asbestos, reinforced rubber belting, leather, plastic, or any other suitable material which will deflect the sparks and heat from the welding operation.

What is claimed is:

1. An electrode holder hand shield including a shield member, and means to connect said member to a holder including a coil spring to grip the holder and retainer straps fixed to said member and passing through said spring to retain the shield member on said spring.

2. An electrode holder hand shield comprising a shield member, a disc thereon of lesser size than the member, an opening through said member and disc which is of a size to permit passing the shield along an electrode holder, and means to resiliently grip the holder to retain the shield thereon, comprising a plurality of looped straps circumferentially spaced, radially disposed, and affixed to said disc, and a coil spring extending through the looped straps and adapted to contract to grip the holder passing through the shield opening so as to retain the shield in protecting position.

3. An electrode holder hand shield comprising a shield member, a reinforcing ring thereon, a plurality of looped strap pieces radially arranged on said ring, an annular coil spring passing through the loops and confined by said straps, an opening through said member, ring, and spring, to receive an electrode holder so that the resiliency of said spring retains the straps and shield on the holder.

PERRY R. THOMPSON.